United States Patent [19]

Nakano

[11] Patent Number: 5,134,307

[45] Date of Patent: Jul. 28, 1992

[54] UNINTERRUPTIBLE POWER SUPPLY APPARATUS AND ISOLATING METHOD THEREOF

[76] Inventor: Hirotami Nakano, 9-25 Ooyodokita 1-chome, Kita-ku, Osaka, Japan

[21] Appl. No.: 525,153

[22] Filed: May 17, 1990

[30] Foreign Application Priority Data

| | | | |
|---|---|---|---|
| May 18, 1989 | [JP] | Japan | 1-124769 |
| May 26, 1989 | [JP] | Japan | 1-133045 |
| Oct. 30, 1989 | [JP] | Japan | 1-282248 |
| Oct. 30, 1989 | [JP] | Japan | 1-282249 |
| Dec. 18, 1989 | [JP] | Japan | 1-328062 |

[51] Int. Cl.$^5$ .................. H02M 7/219; H02J 9/06
[52] U.S. Cl. .................................. 307/87; 363/17; 363/37; 363/89; 363/126
[58] Field of Search .............. 307/89; 363/17, 37, 363/89, 126

[56] References Cited

U.S. PATENT DOCUMENTS

| | | | |
|---|---|---|---|
| 2,802,069 | 8/1957 | Weber, Jr. ............... | 330/192 X |
| 4,084,217 | 4/1978 | Brandli et al. ............ | 363/4 |
| 4,564,897 | 1/1986 | Okamoto et al. .......... | 363/132 |
| 4,686,614 | 8/1987 | Costello .................... | 363/17 |
| 4,719,550 | 1/1988 | Powell et al. ............. | 363/37 |
| 4,802,076 | 1/1989 | Asai ......................... | 363/19 |
| 4,827,151 | 5/1989 | Okado ...................... | 363/37 |
| 4,841,429 | 6/1989 | McClannahan et al. .... | 363/126 |
| 4,860,184 | 8/1989 | Tabisz ...................... | 363/17 |

FOREIGN PATENT DOCUMENTS

| | | |
|---|---|---|
| 2508314 | 9/1976 | Fed. Rep. of Germany . |
| 2610461 | 5/1988 | France . |
| 1506633 | 4/1978 | United Kingdom . |

OTHER PUBLICATIONS

B. E. Hart, "Power Filter Configuration", *IBM Technical Disclosure Bulletin*, vol. 19, No. 7, Dec. 1976, pp. 2596–2597.

*Primary Examiner*—A. D. Pellinen
*Assistant Examiner*—D. Le
*Attorney, Agent, or Firm*—Knobbe, Martens, Olson & Bear

[57] ABSTRACT

A commercial alternating current power source is provided to a first frequency converting circuit (PC1) through a filter circuit (F) and a reactor (LAC). A high frequency switching power supply circuit (15) of the first frequency converting circuit is switched in response to the commercial alternating current power source to output high frequency power. The high frequency power is transferred to a second frequency converting circuit (PC2) through dielectric materials in capacitors (C1, C2) using electric field thereof as a transfer medium. In the second frequency converting circuit, a rectifying circuit (70) rectifies the high frequency power, so that a charging circuit 72) charges a back-up battery (BT) in response to a rectified output. An inverter 77 included in the second frequency converting circuit is switched to output alternating current power, in response to the output of the first frequency converting circuit when the power source is normal, and in response to the battery when the power source is interrupted, respectively. An isolation barrier 44 of the capacitors isolates the second frequency converting circuit from the first frequency converting circuit, whereby an isolation circuit can be made lighter and more compact.

5 Claims, 9 Drawing Sheets

UNINTERRUPTIBLE POWER SUPPLY APPARATUS AND ISOLATING METHOD THEREOF

DESCRIPTION OF THE BACKGROUND ART

1. Field of the Invention

The present invention relates generally to uninterruptible power supply (UPS) apparatuses and isolating method thereof. More particularly, the present invention relates to an UPS apparatus employing a high frequency (HF) switching power supply circuit to allow an isolation circuit to be made more compact and lighter and an isolating method thereof.

2. Description of the Prior Art

A basic function of an UPS apparatus is to keep supplying power to a load by using a commercial power source as energy source when the commercial power source is normal, and using a storage battery or the like as energy source when the commercial power source or the like is interrupted.

The USP apparatus ordinarily employs a transformer for isolation in its output region or input region. However, since as a transformer, a transformer for low frequency is used, in principle it inevitably takes volume and weight to some extent, which is a serious obstacle to making an UPS apparatus more compact and lighter.

Recently in many cases, in place of such a low frequency transformer, a HF switching power supply circuit for outputting HF alternating current (AC) power is employed wherein the isolation is made at the output side of the HF switching power supply circuit. More specifically, an isolation circuit comprising a HF transformer is provided on an output stage side of a HF switching power supply circuit. An isolating method by using this HF transformer makes a low frequency transformer unnecessary, allowing a HF transformer to be made more compact and lighter than by an isolating method by using a low frequency transformer.

However, transformer loss is increased when the transformer is excited by the HF current. This transformer loss includes iron loss due to magnetic materials, copper loss due to windings or the like. When using a HF transformer, such losses not only reduce power conversion efficiency but also present such problem as countermeasure to heat radiation for the losses or the like.

In addition, problems are pointed out concerning electromagnetic interference problems, for example, that display image of a computer is affected by leakage flux of the HF transformer and that other electronic devices receive obstacle noise due to radiation electromagnetic field from the HF transformer.

On the other hand, in theory, even a HF transformer requires such heavy members as windings made of copper wire coils and cores made of magnetic materials, such as ferrite or cobalt amorphous, which are obstacles in making an UPS apparatus more compact and lighter.

SUMMARY OF THE INVENTION

Therefore, a principal object of the present invention is to provide an UPS apparatus in which losses can be reduced, and an isolating method thereof.

Another object of the present invention is to provide an UPS apparatus in which such electromagnetic interference problems can be reduced as gives less obstacle noise to other electronic devices, and an isolating method thereof.

A further object of the present invention is to provide an UPS apparatus which can be suitably made compact and lighter and an isolating method thereof.

Briefly stated, the present invention is an UPS apparatus having a HF switching power supply circuit for outputting HF power connected to an isolation circuit comprising capacitors.

Accordingly, in accordance with the present invention, there is no need to provide a HF transformer for isolation, so that loss in an UPS apparatus can be reduced and the apparatus can be made more compact and lighter.

According to another aspect of the present invention, a first frequency converting circuit is switched in response to an input power source, and outputs HF power, the HF power passed through an isolation barrier of a capacitors, using an electric field as a medium, so that a second frequency converting circuit is switched in response to the passed HF power and outputs AC power.

Accordingly, in accordance with the present invention, the loss in an UPS apparatus can be reduced and the apparatus can be more compact and lighter by isolating the second frequency converting circuit from first frequency converting circuit by means of capacitors, without using a transformer.

More preferably, the first frequency converting circuit comprises a rectifying circuit for rectifying an input power source, a switching circuit for switching a rectified output, and a control circuit for switching the switching circuit.

In addition, the second frequency converting circuit comprises a rectifying circuit for rectifying the HF power passed through the capacitors, a battery for discharging when power is interrupted, a charging circuit for charging the battery by the rectified output, and an inverter for outputting AC voltage in response to an output of the rectifying circuit when the power is supplied, and for outputting AC voltage in response to a voltage discharged from the battery when the power is interrupted.

Still more preferably, a filter comprising reactors or a choke coil having high impedances with respect to switching frequencies of the first and second frequency converting circuits is connected to an output of the inverter circuit.

Accordingly, in accordance with a more preferred embodiment of the present invention, HF power of a common mode can be prevented from leaking by connnecting the reactors or the choke coil to the output of the second frequency converting circuit.

In addition, another aspect of the present invention is an isolating method of an UPS apparatus comprising the steps of converting power from the input power source into AC power of HF and passing the AC power through the isolation barrier, using the electric field as medium.

Furthermore, according to a further aspect of the present invention, capacitors are connected between the first frequency converting circuit being switched in response to an input power supply to output HF power and the second frequency converting circuit for supplying AC power to a load, whereby the circuits are isolated with each other by an isolation barrier of the capacitors.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
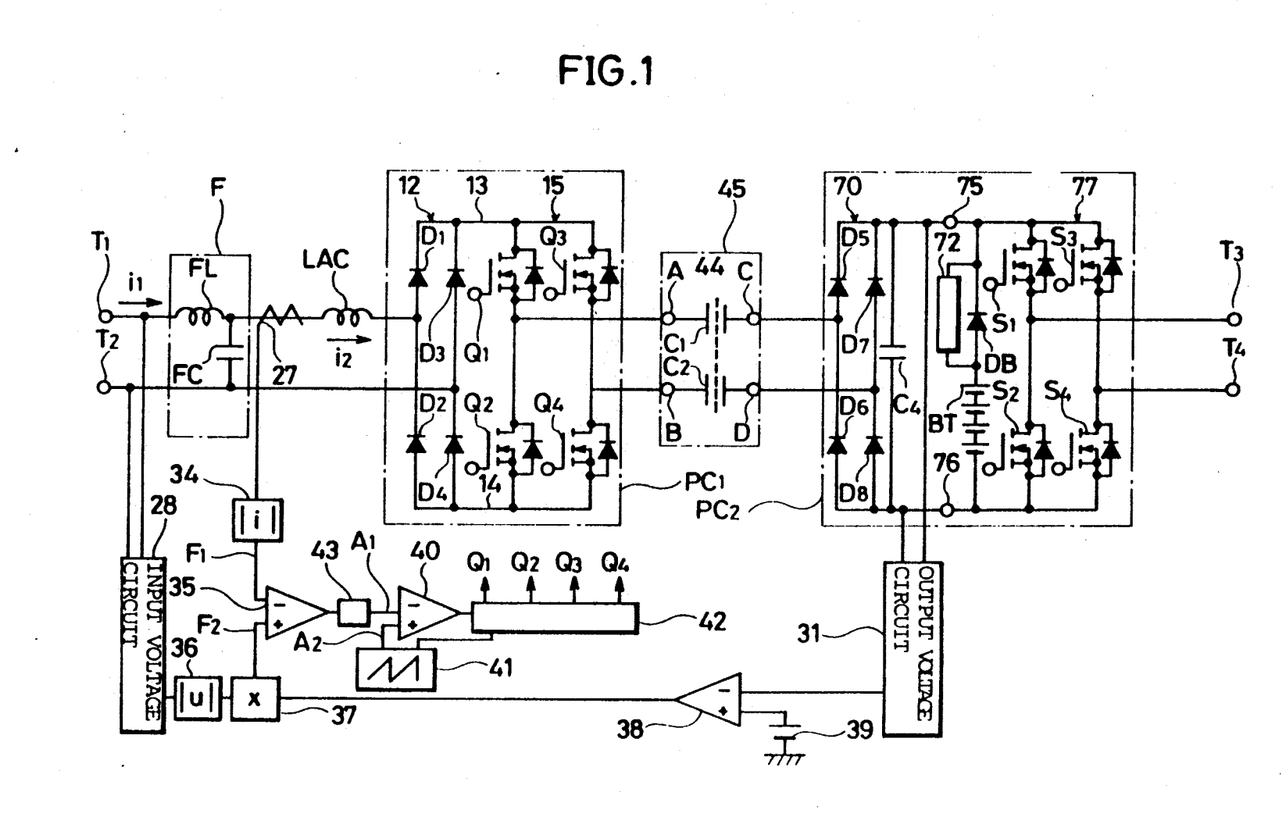
FIG. 1 is a circuit diagram showing two frequency converters and an isolation circuit between the two frequency converters.

FIG. 1 is an electric circuit diagram showing a first embodiment of the present invention. Referring to FIG. 1, commercial AC power source terminals T1 and T2 of the UPS apparatus are connected to a low-pass filter circuit F comprising a reactor FL and a capacitor FC. An output line of this filter circuit F is connected to a current controlling reactor LAC.

A first frequency converting circuit PC1 comprises a rectifying circuit 12 including four bridge-connected diodes D1, D2, D3 and D4, and a HF switching power supply circuit 15 having bridge-connected first, second, third and fourth switching elements Q1, Q2, Q3 and Q4. A pair of AC input terminals of the first frequency converting circuit PC1 are connected to the commercial AC power source terminals T1 and T2 of the UPS apparatus through the reactor LAC and the filter circuit F. The HF switching power supply circuit 15 is connected between a pair of power lines 13 and 14 connected to direct current (DC) output terminals of the rectifying circuit 12. Each of switching elements Q1, Q2, Q3 and Q4 constructing the HF switching power supply circuit 15 comprises a power MOSFET containing a flywheel diode.

Output terminals of the first frequency converting circuit PC1, that is, output terminals of the HF switching power supply circuit 15 are connected to terminals A and B on a primary side of an isolation circuit 45, where the primary side terminal A of the isolation circuit 45 is connected between the first and the second switching elements Q1 and Q2, and the other primary side terminal B is connected between the third and the fourth switching elements Q3 and Q4. Terminals C and D on the secondary side of the isolation circuit 45 are connected to a pair of input terminals of a second frequency converting circuit PC2.

The isolation circuit 45 comprises the primary side terminals A and B, and the secondary side terminals C and D, both connected in series through capacitors C1 and C2, respectively. An isolation barrier 44 is formed between the primary side terminals A and B and the secondary side terminals C and D, whereby the secondary side terminals C and D electrically float with respect to the primary side terminals A and B. It should be noted here that the current outputted from the HF switching power supply circuit 15 does not flow directly through the inside of capacitors C1 and C2 but is transmitted to the other side through dielectric in the capacitors C1 and C2, using the electric field as medium. Namely, dielectric materials in the capacitors C1 and C2 are isolating materials. Accordingly, the HF power outputted from the HF switching power supply circuit 15 is transmitted through the isolation barrier 44 formed out of the capacitors C1 and C2 to the second frequency converting circuit PC2 side, using the electric field as power transmitting medium. The isolation barrier 44 formed out of the capacitors C1 and C2 offer substantially infinite impedance to DC, and also offer impedance substantially large enough to AC of a low frequency, especially to a commercial frequency (50 Hz or 60 Hz) because capacitances of the capacities C1 and C2 can be extremely reduced due to higher frequency of operation. Therefore, even if an input side ground and an output side ground differ in potential, a direct current or a low frequency current flowing in the UPS apparatus due to a potential difference between the grounds can be extremely effectively suppressed by the isolation barrier 44.

The second frequency converting circuit PC2 comprises a HF rectifying circuit 70 including diodes D5, D6, D7 and D8, a pair of input terminals of the HF rectifying circuit 70 being connected to the terminals C and D of the isolation circuit 45. A smoothing capacitor C4 is connected between a pair of output power lines of the HF rectifying circuit 70. An inverter 77 and an interruption back-up storage battery BT are connected between DC output terminals 75 and 76 through a charging circuit 72. The charging circuit 72 is a charging circuit for the storage battery BT, and in more detail, the charging circuit 72 is a charging current limiting circuit for limiting a charging current, and is comprised of a transistor and a resistor. A blocking diode DB is connected in parallel to the charging circuit 72. Ordinarily, the storage battery BT is charged through the charging circuit 72. When the commercial power source is interrupted, the energy stored in the storage battery BT is supplied through the diode DB to the inverter 77. The inverter 77 is formed out of bridge-connected fifth, sixth, seventh and eighth switching elements S1, S2, S3 and S4. Each of the switching elements S1, S2, S3 and S4 comprises a power MOSFET containing a flywheel diode. The inverter 77 has an operating frequency higher than audio frequency band so as not to generate acoustic noise, and outputs an AC voltage by using conventional pulsewidth modulation method. More detailed description of the inverter 77 will not be made. The AC power outputted from the inverter 77, that is, the AC power outputted from the second frequency converting circuit PC2 is supplied to the load through the load terminals T3 and T4. Since the AC power outputted from the second frequency converting circuit PC2 includes unnecessary harmonic components due to the switching, the power is supplied to the load through a filter. The filter circuit and the load are not shown in the drawing.

The first, second, third, and fourth switching elements Q1, Q2, Q3 and Q4 of the above described HF switching power supply circuit 15 are controlled so as to function as inverters (inverter control) and so as to be short-circuited (short-circuit control) as well. The short-circuit control is performed by turning on the first and second switching elements Q1 and Q2 together, or the third and fourth switching elements Q3 and Q4 together, in order to control the current of the reactor LAC. The inverter control is performed by alternately repeating the on state of both the first and fourth switching elements Q1 and Q4 at the same time, and the on state of both the second and third switching elements Q2 and Q3 at the same time, in order to output a HFAC power, that is, it is what is called an inverter operation for converting from DC to AC.

In order to preform both the inverter control and the short-circuit control, a current detector 27 for detecting a current i2 flowing through the reactor LAC is provided between the filter circuit F and the reactor LAC. In addition, an input voltage detecting circuit 28 for obtaining a reference sine-wave which is to be compared with the detected current i2 is connected to the commercial AC power source terminals T1 and T2. An output voltage detecting circuit 31 for detecting an output DC voltage of the HF rectifying circuit 70 is connected to the DC output terminals 75 and 76.

The current detector 27 is connected to one input terminal (inversion input terminal) of a first error amplifier 35 through an absolute value circuit 34. An output line of the input voltage detecting circuit 28 is connected to the other input terminal (non-inversion input terminal) of the first error amplifier 35 through an absolute value circuit 36 and a multiplication circuit 37. The first error amplifier 35 generates an output corresponding to a difference between the current i2 including a small ripple component and the sine-wave voltage.

In order to control the HF switching power supply circuit 15 such that the output voltage of the HF rectifying circuit 70 is kept constant, an output line of the output voltage detecting circuit 31 is connected to one input terminal (inversion input) of a second error amplifier 38, and a reference voltage source 39 is connected to the other input terminal (inversion input) of the error amplifier 38. The second error amplifier 38 generates an output voltage corresponding to a difference between the detection voltage and the reference voltage, and transmits the same to the multiplier 37. The multiplier 37 supplies to the non-inversion input terminal of the first error amplifier 35, a value which is obtained by multiplying an amplitude of the reference sine-wave waveform applied from the absolute value circuit 36 by the output of the second error amplifier 38.

One input terminal (inversion input) of a voltage comparator 40 is connected to an output terminal of the first error amplifier 35 through a low pass filter 43, and the other input terminal (non-inversion input) thereof is connected to a sawtooth wave generating circuit 41. This comparator 40 outputs a comparison output of both inputs in a binary manner.

A switch control signal forming circuit 42 connected to an output terminal of the comparator 40 forms control signals of switching elements Q1–Q4, based on the output of the comparator 40 and the sawtooth wave generating circuit 41. Although output lines of this control signal forming circuit 42 are not shown in the drawing, the lines are connected to control terminals (gates) of the respective switching elements Q1–Q4.

Figure 2:
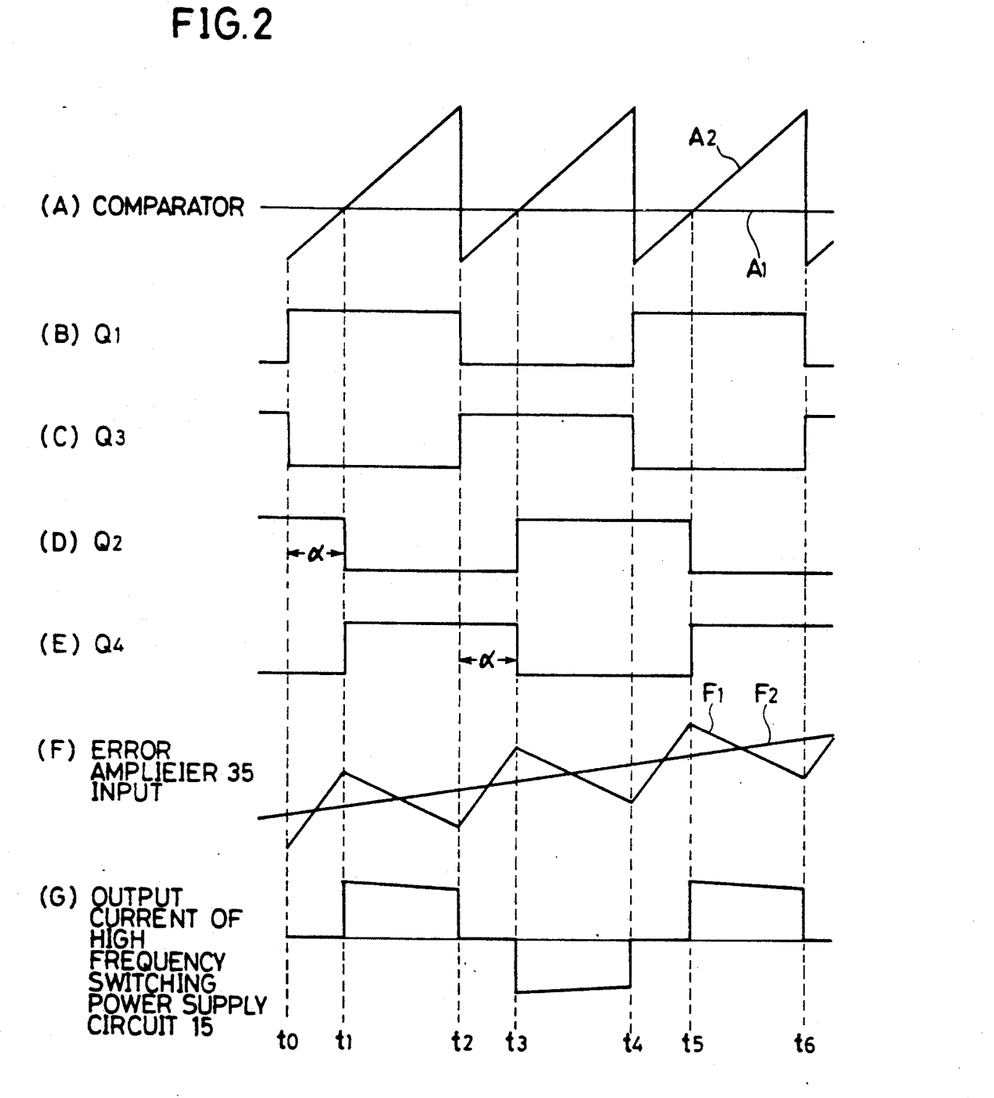
FIG. 2 is a timing chart explaining an operation of the UPS apparatus shown in FIG. 1.

FIG. 2 is a timing chart explaining an operation of the UPS apparatus of FIG. 1. Now referring to FIG. 2, the operation of the UPS apparatus shown in FIG. 1 will be described. In order to make the isolation circuit 45 more compact and lighter, a HF power is generated by the HF switching power supply circuit 15, thereby setting a repetition frequency of the sawtooth wave generated from the sawtooth wave generating circuit 41 sufficiently higher than a frequency of the commercial AC power source. Accordingly, the current i2 flowing through the reactor LAC of FIG. 1 has a waveform including a small ripple in response to on/off control of the switching elements Q1–Q4 of the HF switching power supply circuit 15. However, since the filter circuit F is provided, the small ripple is removed, whereby a waveform of the input current i1 approximately becomes a sine-wave.

In case the circuit of FIG. 1 is operated, a sawtooth waveform A2 shown in FIG. 2 (A), a control signal of the first switching element Q1 shown in FIG. 2 (B) and a control signal of the third switching element Q3 shown in FIG. 2 (C) are generated from the sawtooth wave generating circuit 41 in synchronization with each other. While in an operation of a voltage source inverter, a phase-inverted signal of the control signal of the first switching element Q1 shown in FIG. 2 (B) is applied to the second switching element Q2, and a phase-inverted signal of the control signal of the third switching element Q3 shown in FIG. 2 (C) is applied to the fourth switching element Q4, in the HF switching power supply circuit 15 according to the present embodiment a control signal having a phase difference larger than 180° with respect to the first and third switching elements Q1 and Q3 is applied to the second and fourth switching elements Q2 and Q4, as shown in FIGS. 2 (D) and (E). This is because the HF switching power supply circuit 15 according to the present embodiment is not a voltage source inverter but is theoretically similar to a current source inverter. Namely, magnetic energy stored in the reactor LAC is power energy of the HF switching power supply circuit 15 and the current flowing through the reactor LAC transitionally becomes a pseudo-current source. Accordingly, the inverter operation has to be that of the current source inverter.

Control signals of FIGS. 2 (D) and (E) are generated based on the first error amplifier 35 and the comparator 40. When the current detecting signal F1 including the ripple shown in FIG. 2 (F) is inputted to one input terminal of the error amplifier 35 and the reference sine-wave F2 shown in FIG. 2 (F) is inputted to the other input terminal from the multiplier 37, a signal A1 including information of the input&current i2 and information of the output voltage is obtained at an output stage of the low pass filter 43 connected to the output terminal of the error amplifier 35. As shown in FIG. 2 (A), when the signal A1 and the sawtooth wave A2 are compared with each other by the comparator 40, the output of the comparator 40 is converted every time the sawtooth wave A2 traverses the signal A1. Namely, the output of the comparator 40 attains the high level in such periods as t1–t2 and t3–t4 in which the sawtooth wave A2 becomes higher than the signal A1. The control signal forming circuit 42 forms control signals of the second and fourth switching elements Q2 and Q4 shown in FIGS. 2 (D) and (E), based on the output of the comparator 40. More specifically, in response to the output of the comparator 40 being inverted at t1, the control signal of the second switching element Q2 is returned to a low level and on the contrary, the control signal of the fourth switching element Q4 is inverted to the high level. When the output of the comparator 40 is converted into the high level again at t3, the control signal of the second switch Q2 is converted into the high level and the control signal of the fourth switching element Q4 is converted into the low level. Such time points as t2 and t4 at which the sawtooth wave A2 traverses the signal A1 from the higher level toward the lower level have no effect on the control signals of the second and fourth switching elements Q2 and Q4. Therefore, the control signals of the second and fourth switching elements Q2 and Q4 shown in FIGS. 2 (D) and (A) are formed by a flip-flop circuit triggered at t1, t3 and t5.

Since in the periods of t0–t1 and t4–t5, both of the first and second switching elements Q1 and Q2 are turned on, the direct current lines 13 and 14 are short-circuited by these switching elements Q1 and Q2. As a result the current i2 flowing into the lines through the reactor is increased as shown in FIG. 2 (F). In the period from t1 to t2, the second switching element Q2 is turned off, so that the short-circuit is released, whereby the current flowing through the first switching element Q1 reaches the switching element Q4 through the capacitor C1, the HF rectifying circuit 70 and the capacitor C2. As a result, the electromagnetic energy stored in the reactor LAC is transmitted to the HF rectifying circuit 70 side, using the electric field passing through the isolation barrier 44 as power transmitting means and the electromagnetic energy is absorbed in the HF rectifying circuit 70 side, so that the current i2 is reduced.

While the third and fourth switching elements Q3 and Q4 are both turned on together in the period t2–t3, a short-circuit is again formed, so that the current i2 is increased again. However, when the fourth switching element Q4 is turned off at t3, the current flowing through the third switching element Q3 reaches the switching element Q4 through the capacitor C2, the HF rectifying circuit 70 and the capacitor C1. As a result, the electromagnetic energy stored in the reactor LAC is transmitted to the HF rectifying circuit 70 side, using the electric field passing through isolation barrier 44 comprised of the capacitors C1 and C2 as power transmitting means and the magnetic energy stored in the reactor LAC is absorbed in the HF rectifying circuit 70 side, so that the current i2 is reduced again. Since a waveform of the AC power source voltage is changed in a sine-wave manner, which is supplied to the error amplifier 35 as a reference, the current i2 is also changed in accordance with the sine-wave voltage. Therefore, in case of the present embodiment, it is possible to approximate a waveform of the input current i2 to a sine-waveform.

When detected value of the DC output voltage detecting circuit 31 changes, an output level of the second error amplifier 38 changes, and an output level of the multiplier 37, that is, an amplitude of the reference sine-waveform changes, whereby a short-circuit time length α is regulated.

As described in the foregoing, in the UPS apparatus according to the present embodiment, since the isolation barrier 44 is constructed by the capacitors C1 and C2, heavy members such as magnetic material such as ferrite or amorphous necessary for constructing a core of a HF transformer and conductor coils constructing windings are not theoretically required. Accordingly, it is possible to make an isolation circuit lighter and more compact in principle.

Figure 3:
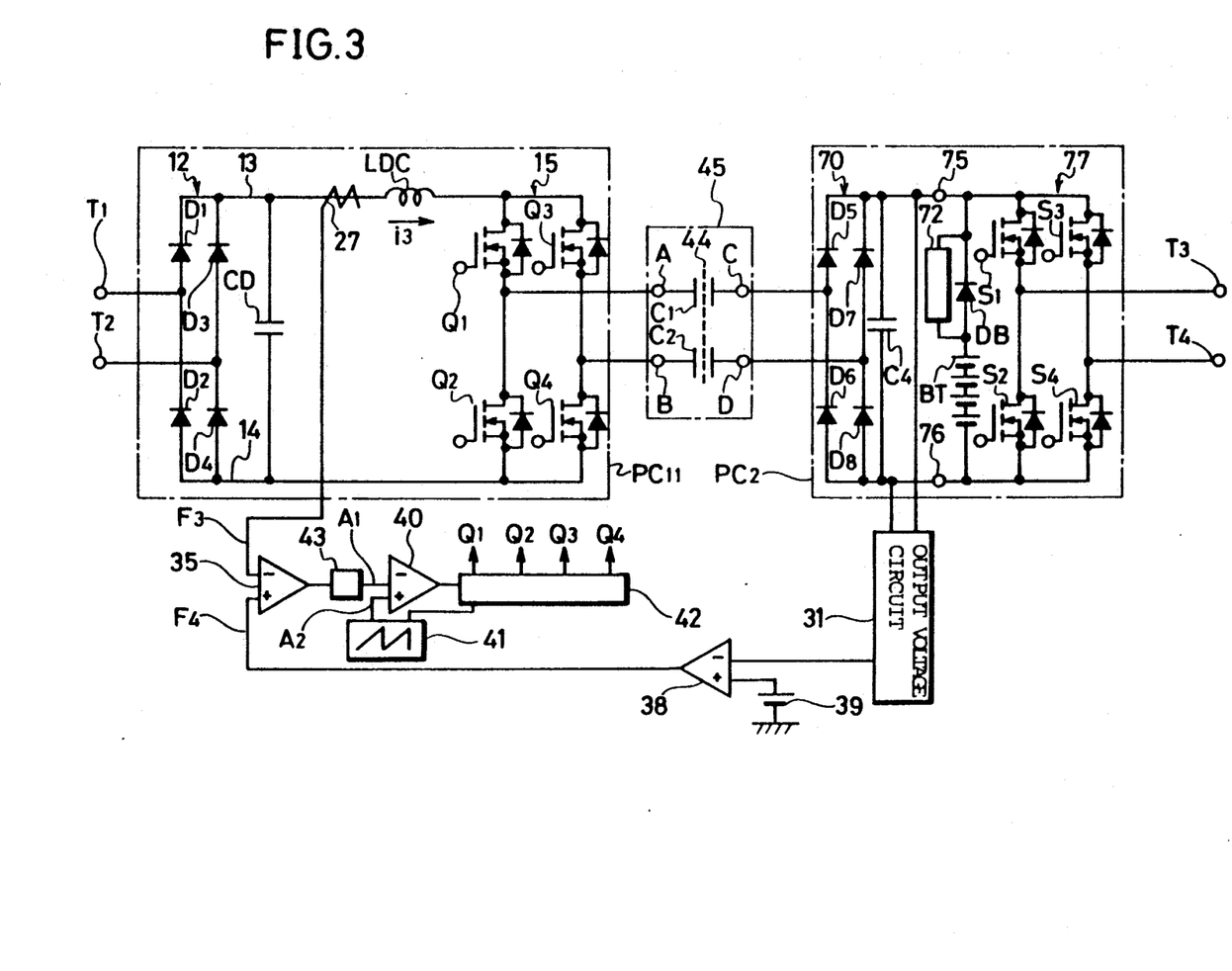
FIG. 3 is a circuit diagram showing the addition of a reactor and detector to the first frequency converter.

FIG. 3 is an electric circuit showing a second embodiment of an UPS apparatus. The embodiment shown in FIG. 3 is constructed in the same manner as that of FIG. 1 described above except for the following points. Namely, a pair of AC input terminals of a first frequency converting circuit PC11, that is, a pair of AC input terminals of the rectifying circuit 12 comprising four bridge-connected diodes D1, D2, D3 and D4, are connected to the commercial AC power source terminals T1 and T2. A smoothing capacitor CD for removing harmonic components is connected between a pair of DC lines 13 and 14 connected to the DC output terminals of the rectifying circuit 12, and a HF switching power supply circuit 15 comprising bridge-connected first to fourth switching elements Q1–Q4 is also connected therebetween through a reactor LDC.

A current detector 27 for detecting a current i3 flowing through the reactor LDC is provided between the smoothing capacitor CD and the reactor LDC and the detector 27 is connected to one input terminal (inversion input terminal) of a first error amplifier 35. In addition, a second error amplifier 38 is connected to a non-inversion input terminal of the first error amplifier 35.

Figure 4:
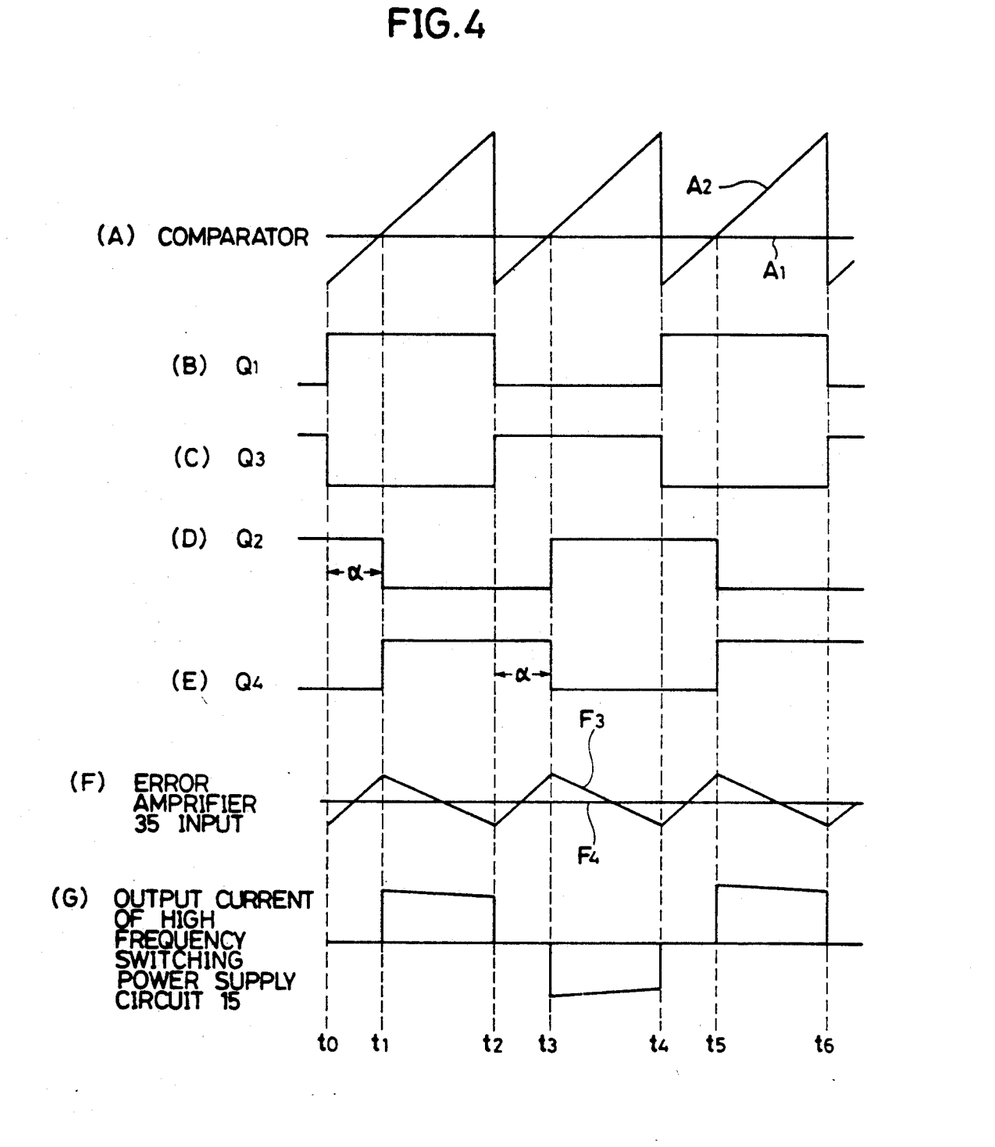
FIG. 4 is a timing chart explaining an operation of the UPS apparatus shown in FIG. 3.

FIG. 4 is a timing chart for explaining an operation of the UPS apparatus shown in FIG. 3.

Now, operations of the UPS apparatus shown in FIG. 3 will be described with reference to FIG. 4, only on those of the different portions from those of the UPS apparatus shown in FIG. 1. The commercial AC power source is inputted to the commercial AC power source terminals T1 and T2, is rectified by the four diodes D1–D4, and each HF component thereof is removed by the smoothing capacitor CD, and then, a DC voltage is applied to the HF switching power supply circuit 15 through the reactor LDC, whereby a HF power is generated from the HF switching power supply circuit 15.

As shown in FIG. 4 (F), the current detecting signal F3 including a ripple is inputted from the current detector 27 to one input terminal of the error amplifier 35 and, the reference current F4 shown in FIG. 4 (F) is inputted from the second error amplifier 38 to the other input terminal. Then, the signal A1 including the information of the input current i3 and the information of the output voltage of the rectifying circuit 70 is obtained at the output stage of the lowpass filter 43 connected to the output terminal of the error amplifier 35. As shown in FIG. 4 (A), when the signal A1 and the sawtooth waveform A2 obtained from the sawtooth wave generating circuit 41 are compared by the comparator 40, the output of the comparator 40 is converted every time the sawtooth wave A2 traverses the signal A1. More specifically, when the sawtooth wave A2 becomes higher than the signal A1, the output of the comparator 40 attains the high level in such periods as t1–t2 and t3–t4. The same operation as that of FIG. 1 will be performed hereinafter.

Figure 5:
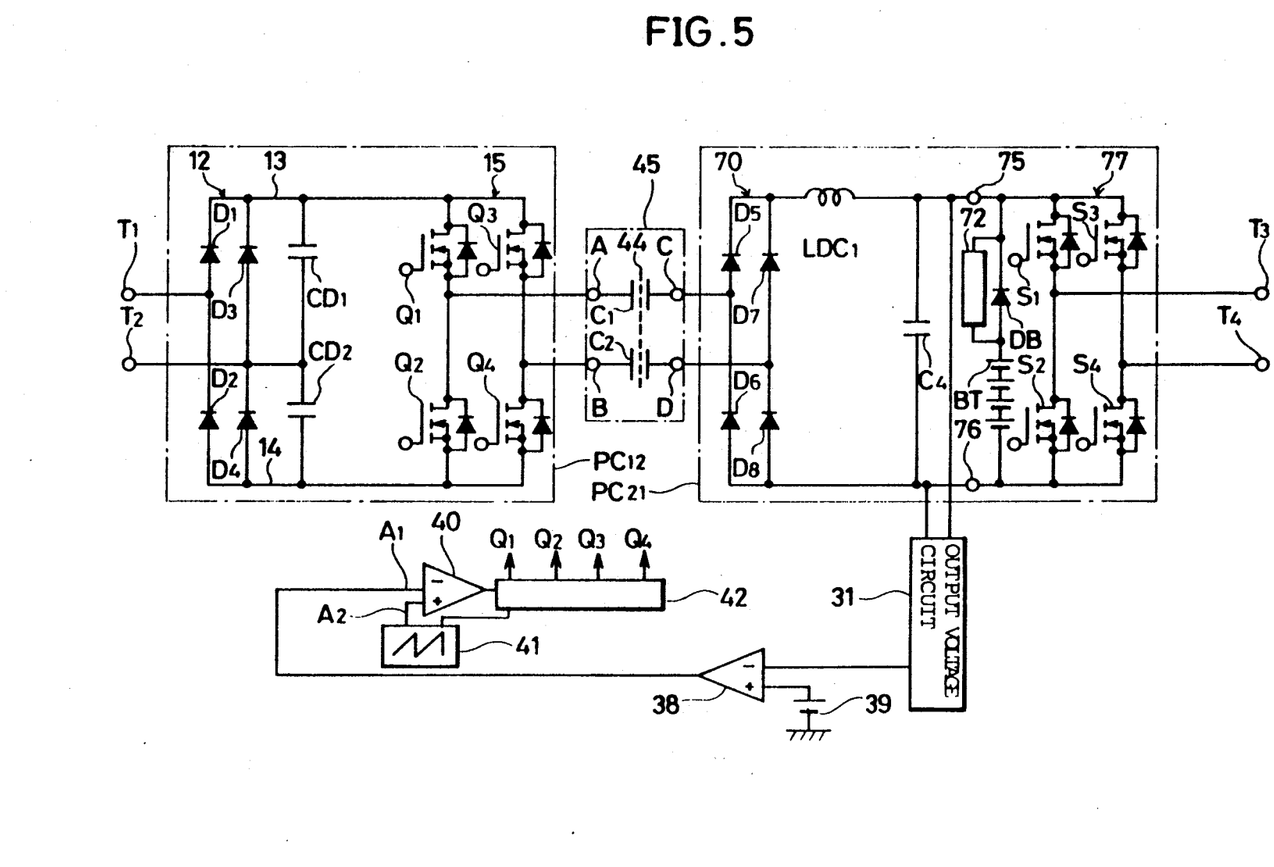
FIG. 5 is a circuit diagram showing the addition of a reactor to the second frequency converter.

FIG. 5 is the electric circuit showing a third embodiment of the UPS apparatus. The embodiment shown in FIG. 5 is constructed in the same manner as the above described FIG. 1, except for the following points. Namely, a pair of AC input terminals of the first frequency converting circuit PC12, that is, a pair of AC input terminals of the rectifying circuit 12 comprising four bridge-connected diodes D1, D2, D3 and D4, is connected to the commercial AC power source terminals T1 and T2. In order to double-voltage-rectify the inputted commercial AC power source, the smoothing capacitors CD1 and CD2 are connected in parallel to the diodes D3 and D4 of the rectifying circuit 12, respectively. Then, the HF switching power supply circuit 15 comprising the bridge-connected first to fourth switching elements Q1-Q4 is connected between the pair of DC lines 13 and 14 connected to the DC output terminals of the rectifying circuit 12. The smoothing capacitor C4 is connected between a pair of output power lines of the HF rectifying circuit 70 comprising the diodes D5, D6, D7 and D8 in the second frequency converting circuit PC21 through the reactor LDC1.

The error amplifier 38 generates an output voltage corresponding to a difference between the detection voltage of the output voltage detection circuit 31 and a reference voltage of the reference voltage source 39 and transmits the same to one input terminal (inversion input) of the voltage comparator 40. The comparator 40 outputs a comparison output of inputs from the sawtooth waveform generation circuit 41 and the error amplifier 38 in a binary manner. A switch control signal forming circuit 421 connected to the output terminal of the comparator 40 forms control signals of the switching elements Q1-Q4, based on the output of the comparator 40 and the sawtooth waveform generation circuit 41. Then, the switching elements Q1-Q4 of the HF switching power supply circuit 15 are controlled so as to function as inverters and so as to have a changing pulse width of an output voltage.

Figure 6:
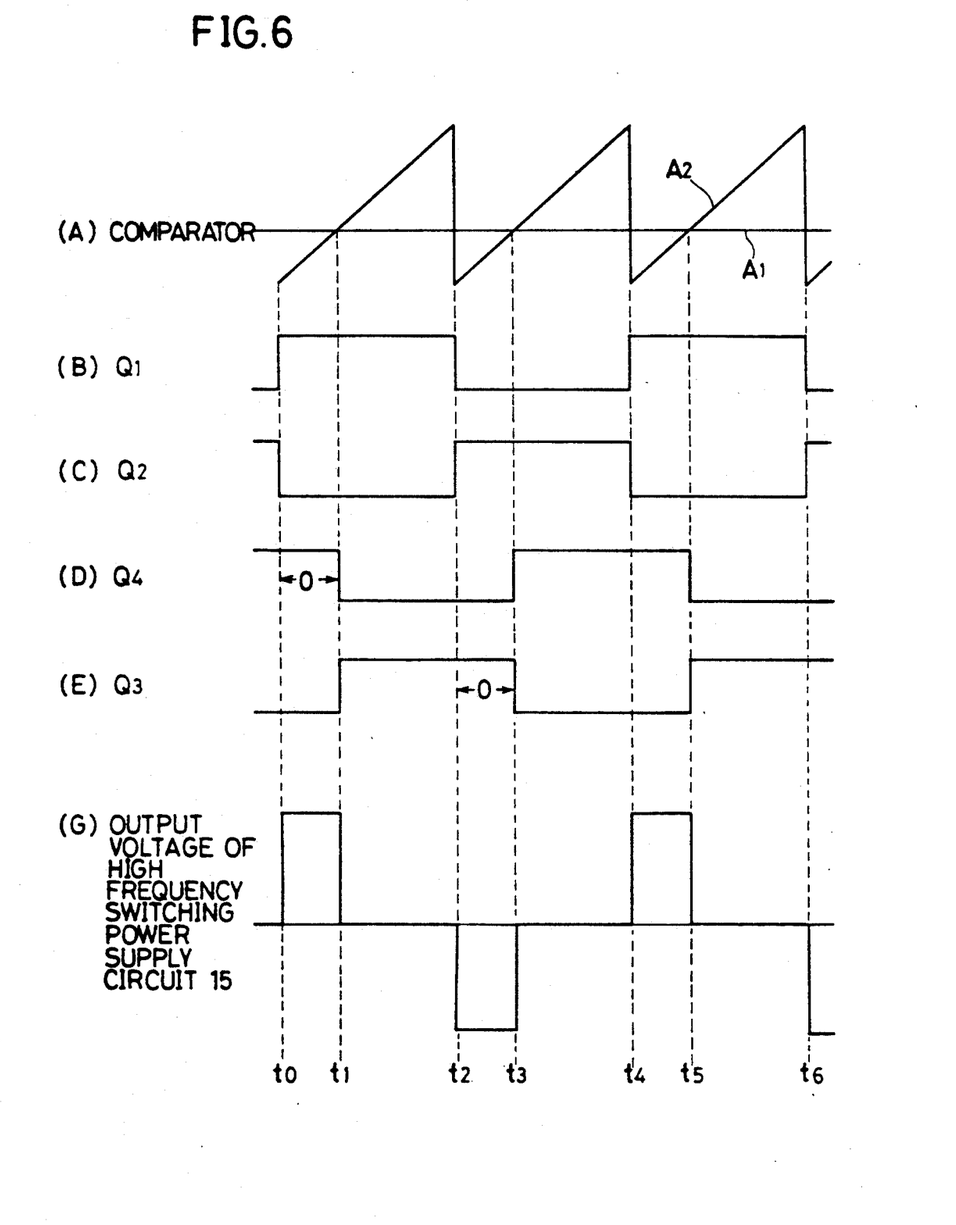
FIG. 6 is a timing chart explaining an operation of the UPS apparatus shown in FIG. 5.

FIG. 6 is a timing chart explaining an operation of the UPS apparatus shown in FIG. 5.

Now, with reference to FIG. 6, operations of the UPS apparatus shown in FIG. 5 will be described. The commercial AC power source is inputted to the commercial AC power source terminals T1 and T2, is double-voltage rectified by the two diodes D1 and D2 and harmonic components thereof are removed by the smoothing capacitors CD1 and CD2, and the double-voltage rectified DC voltage is applied to the HF switching power supply circuit 15, whereby a HF power is generated from the HF switching power supply circuit 15. In order to operate the circuit of FIG. 5, the sawtooth waveform A2 shown in FIG. 6 (A), a control signal of the first switching element Q1 shown in FIG. 6 (B) and a control signal of the second switching element Q2 shown in FIG. 6(C) are generated from the sawtooth wave generation circuit 41 in synchronization with each other. Then, a phase-inverted signal of the control signal of the first switching element Q1 is applied to the second switching element Q2 and a phase-inverted signal of the control signal of the third switching element Q3 is applied to the fourth switching element Q4. Namely, an inverter operation of a voltage source inverter is performed. This is because the HF switching power supply circuit 15 according to the present embodiment is a voltage source inverter using electrostatic energy of the smoothing capacitors CD1 and CD2 as substantive input power source energy, and voltages of the smoothing capacitors CD1 and CD2 become pseudo voltage source. Accordingly, the inverter operation should be that of the voltage source inverter.

The control signals of FIGS. 6 (D) and (E) are formed based on the output of the comparator 40. As shown in FIG. 6 (A), when the signal A1 obtained from the error amplifier 38 and the sawtooth waveform A2 obtained from the sawtooth wave generation circuit 41 are compared with each other by the comparator 40, the output of the comparator 40 is converted every time the sawtooth wave A2 traverses the signal A1. Namely, the output of the comparator 40 attains the high level in such periods as t1-t2 and t3-t4 wherein the sawtooth wave A2 becomes higher than the signal A1. The control signal forming circuit 421 forms the control signals of the fourth and the third switching element Q4 and Q3 shown in FIGS. 2 (D) and (E), based on the output of the comparator 40. Namely, the control signal forming circuit 421 returns the control signal of the fourth switching element Q4 to the low level in response to the output of the comparator being inverted at t1, and on the contrary, inverts the control signal of the third switching element Q3 to the high level. When the output of the comparator 40 is again converted to the high level at t3, the circuit 421 converts the control signal of the fourth switching element Q4 to the high level and the control signal of the third switching element Q3 to the low level. Such time points as t2 and t4 at which the sawtooth wave A2 traverses the signal A1 from a higher level toward lower level have no effect on the control signals of the fourth and third switching elements Q4 and Q3. Therefore, the control signals of the fourth and third switching elements Q4 and Q3 of FIGS. 6 (D) and (E) are formed by a flip-flop circuit triggered at t1, t3, and t5.

Since both the first and fourth switching elements Q1 and Q4 are turned on in the period of t0-t1, the voltage between the DC lines 13 and 14 is outputted from the HF switching power supply circuit 15. Then, electric power is transmitted to the HF rectifying circuit 70 side, using the electric field through the isolation barrier 44 as power transmitting means.

Since both the first and third switching elements Q1 and Q3 are turned on in the period t1-t2, a voltage between the DC lines 13 and 14 is not outputted from the HF switching power supply circuit 15. Namely, the output voltage of the HF switching power supply circuit becomes zero voltage.

When both the second and third switching elements Q2 and Q3 are turned on from t2 to t3, the voltage of the DC lines 13 and 14 is again outputted from the HF switching power supply circuit 15, with a polarity of each output voltage being opposite to that in the period from t0 to t1.

Since both the second and fourth switching elements Q2 and Q4 are turned on in a period from t3 to t4, the voltage between the DC lines 13 and 14 is not outputted. Namely, the output voltage of the HF switching power supply circuit becomes zero, voltage.

Through the repetition of such series of operations as described above, a HF voltage is outputted from the HF switching power supply circuit 15. Then, when a detected value of the DC output voltage detecting circuit 31 changes, the output level of the error amplifier 38 is changed, whereby a time length $\theta$ of the output voltage is regulated.

As described in the foregoing and shown in FIG. 1 to FIG. 6, according to the embodiments of the present invention, since an isolation circuit connected to an output of a HF switching power supply circuit, is structured by capacitors such that an isolation barrier formed out of the capacitors performs isolation, such magnetic material as amorphous or ferrite required for constructing a core of a HF transformer and such heavy members as copper wire coils required for constructing winding of a HF transformer are not needed in theory. Therefore, it is easy in principle to make an isolation circuit lighter and more compact.

In addition, in case of an isolation circuit comprising capacitors, there occurs little iron loss or copper loss. Hence, theoretically the loss can be effectively reduced, especially by using capacitors having an extremely small dielectric loss tangents such as the polypropylene film capacitor.

Furthermore, in case of an isolation circuit comprising capacitors, substantially, the isolation circuit hardly generates strong leakage magnetic field, so that a desired result can be obtained with respect to the electromagnetic environment.

Figure 7:
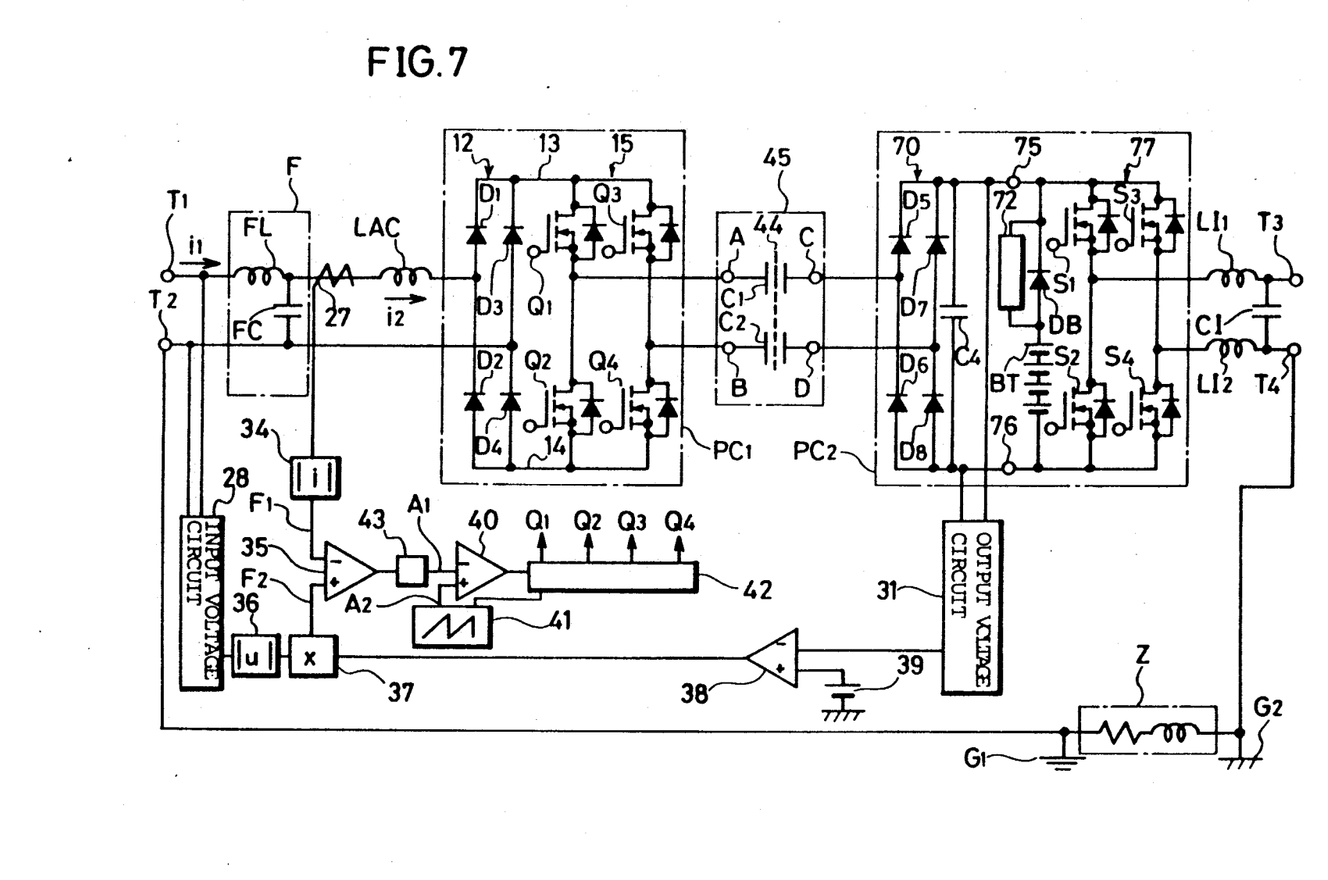
FIG. 7 is a circuit diagram showing the addition of two reactors and a capacitor to the second frequency converter.

FIG. 7 is the circuit diagram of the fourth embodiment of the present invention. The embodiment shown in FIG. 7 differs from that of FIG. 1 in that a filter is provided at an outputting portion of the inverter 77, and input terminal T2 is connected to a ground G1, the output terminal T4 is connected to a group G2 and the grounds G1 and G2 are connected with an impedance Z. The other parts of the structure are the same as those of FIG. 1.

In FIG. 7, the filter at the output portion of the inverter 77 comprises reactors LI1 and LI2 and a capacitor CI. Reactor LI1 is provided on a power line connecting a connection point between switching elements S1 and S2 and an output terminal T3. Reactor LI2 is provided on a power line connecting a connection point between switching elements S3 and S4 and an output terminal T4. Capacitor CI is connected between output terminals T3 and T4.

Now, the operation of the embodiment shown in FIG. 7 will be described. The operations of the common portions to those of FIG. 1 are the same, and therefore description will be made only on the different portions. The AC power outputted from inverter 77, that is, the AC power outputted from the second power frequency converting circuit PC2 contains a large amount of harmonic components of normal mode and common mode due to switching. Therefore, the power is supplied from the output terminals T3 and T4 to the load side through the filter comprising the reactors LI1 and LI2 and the capacitor CI. The reactors LI1 and LI2 are high impedance, and the capacitor CI of the filter is low impedance to the switching frequency of the inverter 77. As a result, a ripple voltage component of the switching frequency outputted from the inverter 77 is removed, thereby supplying an AC voltage of the commercial frequency of a smooth sine-waveform to the load.

Now, a detailed description will be made on functions of the reactors LI1 and LI2. The reactors LI1 and LI2 are for preventing a HF current from flowing from the impedance Z through the isolation barrier 44. Either one of the reactors LI1 and LI2 is basically unnecessary in case the impedance Z between a ground G1 and a ground G2 is infinite, that is, the grounds G1 and G2 are electrically and completely, independent with each other.

However, if the impedance Z is not a high impedance with respect to a switching frequency of the HF switching power supply circuit 15 or to a switching frequency of the inverter 77, the reactors LI1 and LI2 play an important role. In case the impedance Z is a low impedance with respect to the switching frequency of the HF switching power supply circuit 15, and either the reactor LI1 or the reactor LI2 is not provided, the electric charges stored in the capacitors C1 and C2 forming the isolation barrier 44 flow as a large amount of common mode currents between the input/output grounds through the impedance Z every time the HF switching power supply circuit 15 is switched.

Furthermore, every time the inverter 77 is switched, a large number of currents of the common mode flow from the inverter 77 through the impedance Z to the capacitors C1 and C2. As a result, a large amount of common mode currents of the HF flow through the switching elements forming the HF switching power supply circuit 15 and the switching elements forming the inverter 77. However, provision of the reactors LI1 and LI2 allows prevention of a current from flowing between the impedance Z and the isolation barrier 44, or a common mode current, which solves the above described problem.

Namely, if inductance values of the reactors LI1 and LI2 are high impedances with respect to the switching frequency of the HF switching power supply circuit 15 and the switching frequency of the inverter 77, respectively, the common current flowing can be effectively suppressed by the reactors LI1 and LI2. Therefore, the reactors LI1 and LI2 prevent the HF currents of the common mode, whereby the voltages of the capacitors C1 and C2 do not abruptly fluctuate, resulting in stable voltages of the capacitors forming the isolation barrier 44.

Figure 8:
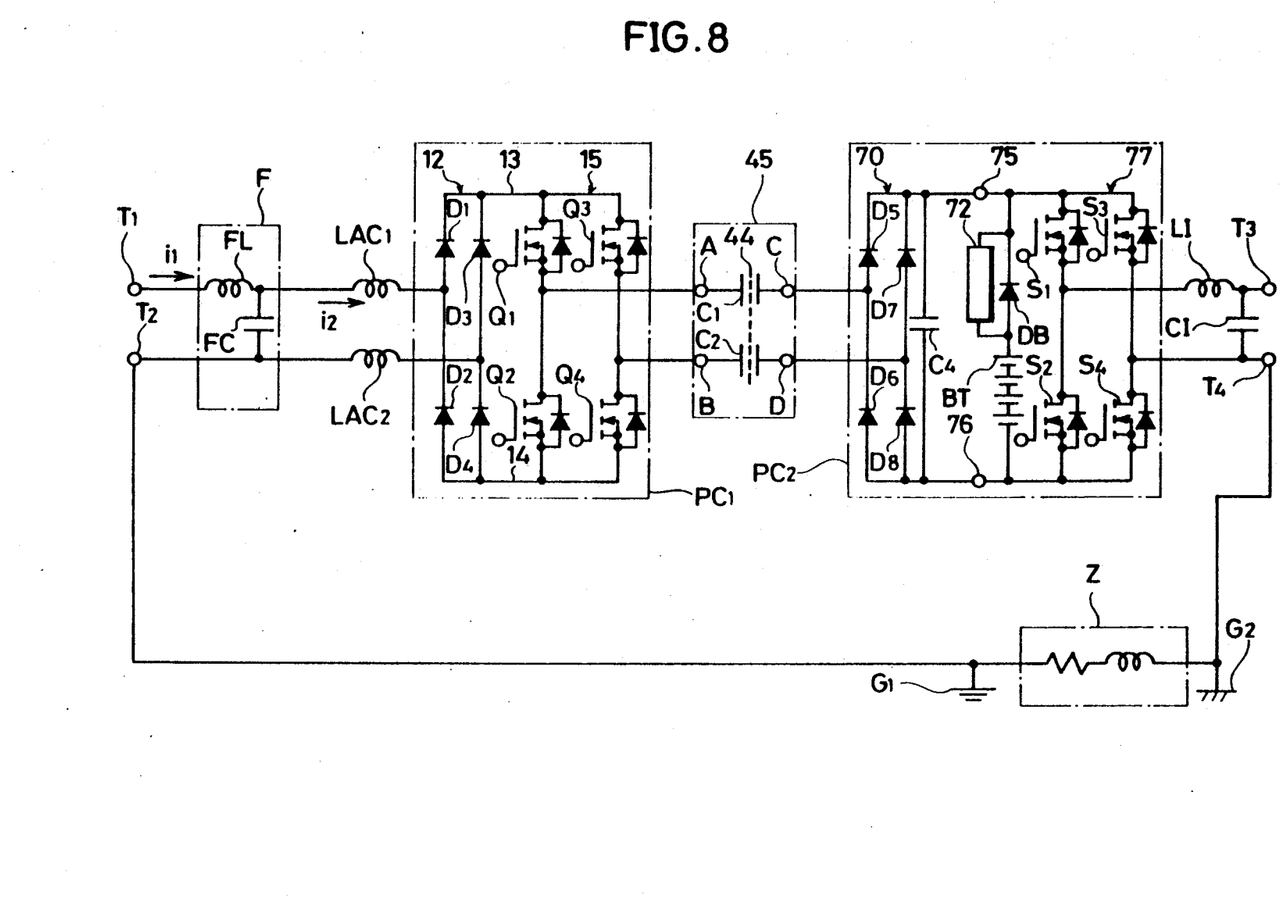
FIG. 8 is a circuit diagram showing a fifth embodiment of the present invention.

FIG. 8 is an electric circuit diagram showing a fifth embodiment of the present invention. While in FIG. 7, the filter on the output side is used for preventing a HF common mode current, in the embodiment shown in FIG. 8 reactors LAC1 and LAC2 for controlling the current i2 on the input side are used for preventing the HF common mode current. Referring to FIG. 8, the input terminals T1 and T2 are connected to the filter circuit F comprising the reactor FL and the capacitor FC. The reactors LAC1 and LAC2 connected to respective output power lines of the filter circuit F are used for controlling the current i2 and also used for preventing the HF current from flowing from the impedance Z through the isolation barrier 44. In FIG. 8, the description of the control circuit is the same as that of FIG. 1, and therefore no description thereof will be made.

In FIG. 8 as well as in FIG. 7, in case the impedance Z between the grounds G1 and G2 is a low impedance with respect to the switching frequency, of the HF switching power supply circuit 15 and either the reactor LAC1 or LAC2 is not provided, the electric charges stored in the capacitors C1 and C2 forming the isolation barrier 44 flow as a large amount of common mode current between the input/output grounds through the impedance Z every time the HF switching power supply circuit 15 is switched. In addition, a large amount of common mode current flows from the inverter 77 through the impedance Z to the capacitors C1 and C2 for every switching operation of the inverter 77. As a result, a large amount of HF common mode current flows to the switching elements forming the HF switching power supply circuit and the switching elements forming the inverter 77. However, the provision of the reactors LAC1 and LAC2 on the respective power lines on the input power source side prevents the HF currents from flowing from the input through output of the UPS apparatus, which resolves the problem. In other words, the common current flowing through the isolation barrier 44 can be effectively interrupted by the pair of reactors LAC1 and LAC2. Therefore, the reactors LAC1 and LAC2 prevent the voltages of the capacitors C1 and C2 from abruptly fluctuating due to the common mode current, resulting in the stable voltages of the capacitors forming the isolation barrier 44.

In the embodiment shown in FIG. 7, the reactors LI1 and LI2 are connected to the output side of the inverter 77, and in FIG. 8 the reactors LAC1 and LAC2 are connected to the input side of the rectifying circuit 12 to prevent the HF current from flowing from the input through the output of the UPS apparatus, or suppress the HF common mode current passing through the isolation barrier 44. However, they are not limited to the embodiments of FIGS. 7 and 8, and a pair of reactors can be connected, for example, between the rectifying circuit 12 and the HF switching power supply circuit 15, or between the filter circuit F and the the pair of input terminals T1 and T2 to similarly prevent the HF current from flowing from the input through the output of the UPS apparatus, thereby suppressing the HF common mode currents passing through the isolation barrier 44.

Figure 9:
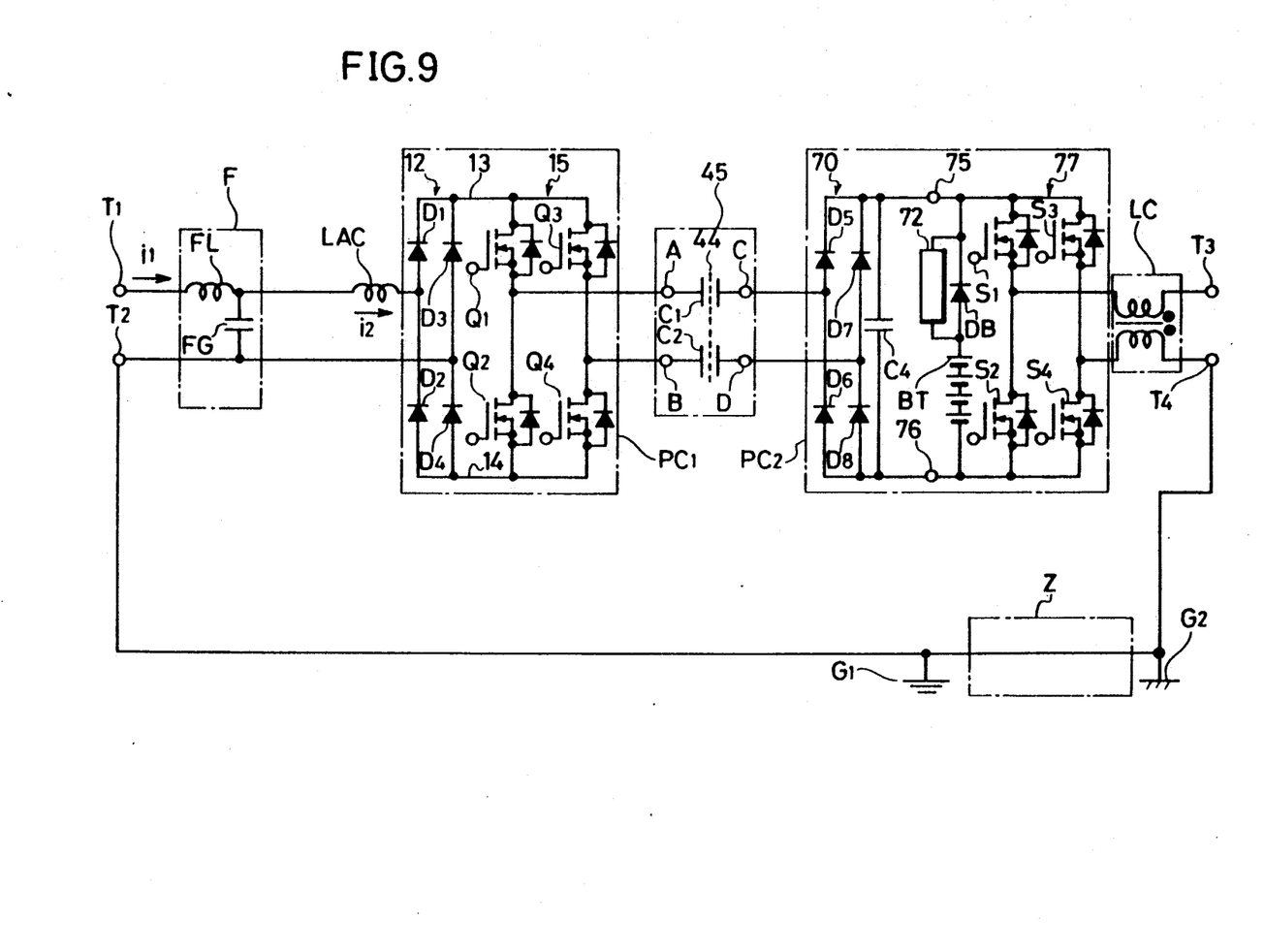
FIG. 9 is a circuit diagram showing the addition of a common mode choke to the second frequency converter.

FIG. 9 is a circuit diagram showing a sixth embodiment of the present invention. The embodiment shown in FIG. 9 is differ from that of FIG. 7 in that a common mode choke LC is connected to the power lines between the inverter 77 and the output terminals T3 and T4 in place of the filter provided at the output portion of the inverter 77 shown in FIG. 7, and the grounds G1 and G2 are connected with each other through zero impedance Z1. The other parts of the main circuit structure are the same as those of FIG. 7. The common choke LC is a high impedance with respect to the switching frequencies of the HF switching power supply circuit 15 and the inverter 77 and effectively suppresses the common mode current generated due to the switching of the HF switching power supply circuit 15 and the inverter. Accordingly, the common mode choke LC suppresses the HF currents of the common mode passing through the isolation barrier 44, so that voltages of the capacitors C1 and C2 do not abruptly fluctuate.

While the common mode choke LC serves as a high impedance in a common mode, it does not principally serve as an impedance in a normal mode. Therefore, even if the common mode choke LC is connected between the HF switching power supply circuit 15 and the isolation circuit 45, or between the isolation circuit 45 and the HF rectifying circuit 70, basically transmission of the HF power of the normal mode outputted from the HF switching power supply circuit 15 to the HF rectifying circuit 70 is not interrupted.

Accordingly, it is not limited to the embodiment of FIG. 9, and the common mode choke LC can be connected between the HF switching power supply circuit 15 and the isolation circuit 45, or between the isolation circuit 45 and the HF rectifying circuit 70 to suppress the HF common mode currents passing through the isolation barrier 45, similarly to FIG. 9.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A power supply apparatus for supplying power to a load, comprising:
    a frequency converter that outputs a high frequency current based on a current of a reactor connected between an input power source and an input of said frequency converter;
    isolating means comprising a pair of capacitors connected to an output of said frequency converter;
    a rectifier connected to an output of said isolating means to rectify said high frequency current;
    a smoothing capacitor connected to an output of said rectifying means for providing a direct-current voltage output;
    an inverter connected to said output of said rectifying means, said inverter outputting an alternating voltage to said load; and
    a filter means connected to an output of said inverter means to suppress a common mode current passing through said pair of capacitors, said filter means comprising a pair of reactors.

2. A power supply apparatus according to claim 1, further comprising:
    a battery connected with said output of said rectifier to deliver a direct-current voltage when said input power source is in an abnormal state.

3. A power supply apparatus for supplying power to a load, comprising:
    a pair of reactors provided to an input power source;
    a frequency converter that outputs a high frequency current based on a current flowing through said pair of reactors, said pair of reactors being connected between said input power source and an input of said frequency converter means;
    isolating means comprising a pair of capacitors connected to an output of said frequency converter;
    a rectifier connected to an output of said isolating means to rectify said high frequency current; and
    a smoothing capacitor connected to an output of said rectifier to provide a direct-current voltage output.

4. A power supply apparatus according to claim 3, further comprising:
    a battery connected to said output of said rectifier that delivers a direct-current voltage when said input power source is an abnormal state; and
    an inverter connected to said output of said rectifier that outputs an alternating voltage to said load.

5. A power supply apparatus according to claim 1 or 3, wherein said pair of reactors comprise a common mode choke.

* * * * *